United States Patent
Hiatt et al.

(10) Patent No.: US 11,819,760 B2
(45) Date of Patent: Nov. 21, 2023

(54) TRACKING AND PROCESSING HISTORY DATA OF A NON-FUNGIBLE TOKEN BASED DIGITAL ASSET

(71) Applicant: Sony Interactive Entertainment LLC, San Mateo, CA (US)

(72) Inventors: Daniel Hiatt, San Mateo, CA (US); Matthew Tomczek, San Mateo, CA (US); Ben Honda Rottler, San Mateo, CA (US); Charlie Denison, San Mateo, CA (US); Warren Benedetto, San Mateo, CA (US)

(73) Assignee: Sony Interactive Entertainment LLC, San Mateo, CA (US)

( * ) Notice: Subject to any disclaimer, the term of this patent is extended or adjusted under 35 U.S.C. 154(b) by 9 days.

(21) Appl. No.: 17/539,875

(22) Filed: Dec. 1, 2021

(65) Prior Publication Data

US 2023/0166185 A1  Jun. 1, 2023

(51) Int. Cl.
*A63F 13/30* (2014.01)
*A63F 13/44* (2014.01)
*A63F 13/5378* (2014.01)

(52) U.S. Cl.
CPC .......... *A63F 13/44* (2014.09); *A63F 13/5378* (2014.09); *A63F 2300/638* (2013.01)

(58) Field of Classification Search
CPC ........ A63F 13/30; A63F 13/327; A63F 13/33; A63F 13/335; A63F 13/35; A63F 13/45; A63F 13/48; A63F 13/49; A63F 13/493; A63F 13/52; A63F 13/58; A63F 13/69; A63F 13/70; A63F 13/73; A63F 13/79
See application file for complete search history.

(56) References Cited

U.S. PATENT DOCUMENTS

| | | | |
|---|---|---|---|
| 10,946,283 B1* | 3/2021 | Meilich | G06Q 20/3674 |
| 2019/0282906 A1* | 9/2019 | Yong | G06Q 20/3825 |
| 2019/0299105 A1* | 10/2019 | Knight | H04L 9/3247 |
| 2019/0385136 A1* | 12/2019 | Blagov | G07F 17/3244 |
| 2021/0350356 A1* | 11/2021 | Mufson | G07F 17/3279 |
| 2021/0366234 A1 | 11/2021 | Cotta | |
| 2022/0215361 A1* | 7/2022 | Koch | G06F 21/64 |
| 2022/0355206 A1* | 11/2022 | Koch | A63F 13/69 |
| 2022/0355208 A1 | 11/2022 | Stephens et al. | |
| 2022/0379226 A1* | 12/2022 | Koch | A63F 13/792 |

OTHER PUBLICATIONS

Invitation to Pay Addl Fees; PCT/US2022/050623, dated Feb. 14, 2023, 12 pages.
Intl Search Report & Written Opinion, PCT/US2022/050623, dated Apr. 13, 2023, 16 pages.

* cited by examiner

*Primary Examiner* — Omkar A Deodhar
(74) *Attorney, Agent, or Firm* — PENILLA IP, APC

(57) ABSTRACT

Methods and systems for tracking a game asset used in a video game includes generating a non-fungible token for the game asset used in the video game. Use of the game asset in the video game is monitored during gameplay to identify a qualifying event occurring in the video game in which the game asset is used. The NFT is updated using metadata associated with the qualifying event. The metadata is used to build legacy of the game asset and to track use of the digital asset in the video game.

19 Claims, 7 Drawing Sheets

| Video game ID | Level ID | Scene ID | Digital asset and owner | Qualifying event | Participants |
|---|---|---|---|---|---|
| Game 1 | Level 3 | Scene 3-a | Sword with player 1 | Defeating monster in 1st attempt | Player 1 and monster |
| Game 1 | Level 4 | Scene 4-h | Sword with player 1 | Defeating dragon in shortest time | Players 1 & 2, and dragon |
| Game 1 | Level 6 | Scene 6-b | Sword with player 1 | Defeating experienced player (player 2 defeated by player 1) | Players 1 and 2 |
| Game 1 | Level 6 | Scene 6-f | Sword with player 3 | Killing dragon in this level for 1st time (killed by player 1) | Players 1-3 and dragon |
| Game 1 | Level 6 | Scene 6-i | Sword with player 4 | Defeating dragons 1 and 2 at same time | Player 4 and dragons 1 and 2 |
| Game 1 | Level 7 | Scene 7-c | Sword with player 4 | Unique move to capture VC1 | Player 4 and VC1 (virtual character 1) |
| Game 1 | Level 9 | Scene 9-a | Sword with player 1 | Surviving attacks from both VC2 and VC3 and proceeding to next scene | Player 1 and VCs 2 and 3 |

Figure 4

| Video game ID | Level ID | Scene ID | Digital asset and owner | Qualifying event | Participants |
|---|---|---|---|---|---|
| Game 1 | Level 2 | Scene 2-c | Double-bladed lightsaber with player 1 | Defeating all monsters in level 2 in 1st attempt | Player 1 and monsters |
| Game 1 | Level 4 | Scene 4-h | Magical sword with player 2 | Defeating dragon and other monsters in shortest time to proceed to next level | Players 1 & 2, and dragon, monsters |
| Game 2 | Level 6 | Scene 6-b | Double-edged sword with player 3 | Defeating any player possessing lightning rod (player 2 having lightning rod) | Players 1 -3 (player 3 defeated player 2) |
| Game 2 | Level 6 | Scene 6-f | Lightning rod with player 3 | Killing dragon with lightning rod for 1st time | Players 1-3 and dragon |
| Game 2 | Level 6 | Scene 6-i | Energized spear with player 5 | Disarming virtual game characters using energized spear | Players 1-5 and virtual characters 1 and 2 |
| Game 2 | Level 7 | Scene 7-c | Magical sword with player 2 | Escaping the dungeon in the castle by overcoming virtual characters | Player 2 and VC4 (virtual character 4) |
| Game 2 | Level 9 | Scene 9-a | Double-bladed lightsaber with player 1 | Surviving the beast in this level | Player 1 and the beast |

Figure 5

TRACKING AND PROCESSING HISTORY DATA OF A NON-FUNGIBLE TOKEN BASED DIGITAL ASSET

TECHNICAL FIELD

The present disclosure relates to tracking and processing historical use of a digital asset in a video game using a non-fungible token.

BACKGROUND OF THE DISCLOSURE

Video games and other interactive applications have grown in popularity and have become mainstream. With the growing popularity of interactive applications, such as video games, and other virtual/augmented reality/mixed interactive applications, tracking a digital asset used in the interactive applications can provide rich and useful information. Typically in a video game, a digital asset is associated with a player when the player acquires the digital asset either through their standing or level in the video game or through their skill in overcoming challenges, or by purchasing or trading the digital asset for another digital asset or another chance or for another level. When a first player possessing the digital asset is defeated or killed in the video game by a second player or the digital asset acquired, the association of the digital asset is updated to remove the first player as the owner and include the second player as the new owner. Consequently, the history of use of the digital asset re-starts when the second player starts using the digital asset in the video game.

Further, a player owning a digital asset may not be able to use the digital asset in another video game that the player owns or plays.

It is in this context that embodiments of the disclosure arise.

SUMMARY

Embodiments of the present disclosure relate to systems and methods for generating non-fungible token (NFT) for a digital asset and using the NFT to track the use of the digital asset within an interactive application, such as a video game. The NFT is created using blockchain technology. By virtue of its definition, the NFT is a unit of data stored on a digital ledger (i.e., blockchain) that certifies a digital asset to be unique and not interchangeable. The NFT can be used to represent any asset, such as photos, videos, audios, paintings, collectibles, and game assets. As each NFT represents a different underlying asset, the NFT will have a different value that is unique for each asset. The metadata associated with the NFT provides the details for generating a unique identification code for the asset so as to distinguish the asset from another asset. When a NFT is created (i.e., minted) for an asset using the blockchain technology, the blockchain strings a set of cryptographic hash to generate a block defining the unique identification code. As the asset is used, the blockchain generates a new data block by stringing another set of cryptographic hash related to the use of the asset to the previously generated identification code and string the new data block to the previous data block to create a chain of unique identifiable data blocks. This unique identification code can be used to track and validate ownership of the asset. "Tokenizing" an asset using the blockchain technology allows an asset to be bought, sold or traded without fear of potential fraud or misrepresentation. As the NFTs can be tracked by virtue of the blockchain, the assets associated with the NFTs can be efficiently and reliably tracked and validated.

The concept of NFT can be extended in the context of video game, wherein the blockchain technology may be used to generate an NFT for a digital asset used in the gameplay and track use of the digital asset within the video game. The digital asset may be a game object, such as a weapon or another game asset used by players to advance in the game or to overcome challenges or to defeat, capture or kill virtual characters of the game or virtual characters representing other players in the game. In addition to overcome challenges in the game, the game asset may also be used by a player to increase their standing in the game. The metadata associated with gameplay of the player using the game asset is used to generate the NFT and includes sufficient details of use of the digital asset. The details of use of the digital asset may include who currently owns the digital asset, who used the digital asset prior to current owner, how the digital asset was used in the video game, where the digital asset was used in the video game, what was the outcome of use of the digital asset, etc.

In some implementations, the NFT of a digital asset may be associated with a player of the video game. When the player uses the digital asset in the video game, the time and space attributes of a portion of a game space of the video game where the digital asset was used is determined and used to track the digital asset. The time and space attributes may relate to an event occurring within the game space. The space attributes may correspond to Cartesian coordinates (x, y, z coordinates) and the time attribute may correspond to the time stamp associated with the gameplay of the portion of the game. These coordinates and the time stamp are used to identify metadata associated with the event occurring in the portion of the game for generating the NFT for the digital asset used by the player in the event. The regenerated NFT includes metadata that can be used to determine history of use, including identity of the digital asset that was used by the player in the event, the participants of the event, outcome of the event, etc. The NFT created (i.e., minted) for the game asset may be associated with the significant event, the digital asset used in the significant event, and/or the player who owned and used the digital asset during the significant event.

As the digital asset continues to be used in additional significant events occurring within the video game, the metadata associated with the additional significant events are used to regenerate the NFT for the digital asset. The regenerated NFT for the digital asset keeps record of all the significant events in which the digital asset was used thereby creating legacy for the digital asset. The legacy can be used by the player to strategize their gameplay of the video game. Usage of the digital asset in the significant events may be used to boost the value of the digital asset, and the value can be used during trading or sale of the digital asset, for example. In another example, the usage history may provide insight into other players' gameplay where the digital asset was used by the other players to overcome challenges in the video game. When the digital asset is traded or sold to a second player, the NFT is regenerated to record change in ownership of the digital asset to the second player using the metadata associated with the transaction. The legacy of the digital asset identifies the current owner of the digital asset and highlights the significant events associated with the digital asset, irrespective of which player was using the digital asset during occurrence of the significant events.

The highlights of significant events may be provided along a timeline with a video clip of the corresponding significant event that occurred in the video game in which the digital asset was used. In addition to identifying significant events, the details included in the NFTs of the digital assets (i.e., game assets or game objects) may also be used to identify other digital assets associated with corresponding NFTs in a vicinity of a player within the game scene of the video game in which the player is currently interacting and present the location of the NFTs of other players in a map format. As part of tracking the digital assets, the system uses the space and time attributes associated with the location of the player in the game scene and included in the details of the NFTs of the different digital assets to identify other digital assets in the vicinity of the player. The NFT information provided in the map may be used by the player to strategize their own gameplay.

The history of use of various game assets maintained using NFTs provides valuable information to the player to allow the player to plan their moves in the video game. The history of use can be used to determine which digital assets were used to overcome specific challenges or virtual characters or players, which player possessed and used the digital assets to overcome the specific challenges or virtual characters, outcomes from use of the digital assets in the video game, how the digital assets were used, etc. The history of use can be used by players to strategize their gameplay of the video game, such as which digital assets to collect, which digital assets to trade or acquire, which digital assets to use to overcome certain challenges in different situations, value of the digital asset based on their use in different situations (e.g., different game scenes or game levels in a video game), which players to interact with to acquire or use the digital asset, nature and type of interaction (e.g., collaborative or competitive interaction), etc. The digital assets associated with interactive application may be game objects or game assets, such as game weapons, useful in overcoming challenges and/or for defeating enemies (e.g., monsters, virtual characters in the game, virtual characters related to other players, etc.), or may be collectible items, such as photos, videos, pictures, other game objects, such as golden key or golden ticket that can be used by specific player to unlock other game item(s) or game level, etc., or in specific events, etc., based on their prior use or value within the video game. Acquisition of the digital assets can be through purchase or trade or by defeating another player or virtual character. The other player or virtual character may be the one who owns the digital asset in the video game or may be significant enough that defeat of the other player or virtual character can result in the player getting rewarded with the digital asset. The digital assets can be used by players to, (a) advance in the video game and make the gameplay more interesting so as to improve user engagement; (b) improve their game standing (e.g., increasing game points or game values of players with certain type of weapons or certain number of different type of weapons, etc.); or (c) improve their bargaining power within the video game.

In one implementation, a method is disclosed. The method includes generating a non-fungible token (NFT) for a digital asset used in a video game selected by a player for gameplay. The use of digital asset in the video game is monitored during gameplay to identify a qualifying event occurring in the video game where the digital asset is used. The NFT of the digital asset is regenerated using metadata included in the NFT and metadata associated with the qualifying event. The regenerated NFT is used to build legacy of the digital asset, which can be used to track use of the digital asset within the video game.

In one implementation, the NFT is updated with the metadata of the qualifying event every time the qualifying event occurs in the video game.

In one implementation, the metadata for the digital asset is identified using time and space attributes associated with game space of the video game where the digital asset is used by the player.

In one implementation, the NFT of the digital asset is associated with the player using the digital asset during occurrence of the qualifying event.

In one implementation, the digital asset associated with the player and the NFT associated with the digital asset are portable to other video games by the player. The porting of the NFT and the digital asset are enabled using an application programming interface.

In one implementation, the regeneration of the NFT of the digital asset includes synchronizing the metadata of the regenerated NFT of the digital asset in the video game with other video games in which the digital asset is used.

In one implementation, the metadata includes information related to at least a timeline in the video game that corresponds to a specific portion of a game space associated with the qualifying event where the digital asset is used, a player identity of the player using the digital asset, participant identity of participants in the qualifying event, a game identity of the video game, a level identity of game level associated with the specific portion, and an event identity and details of the qualifying event of the video game. The specific portion of the game space is identified using time and space attributes associated with the game space of the video game. The participants include other players or virtual characters of the video game.

In one implementation, the qualifying event is an event that meets a predefined threshold defined based on statistics collected during the gameplay of the video game.

In one implementation, the predefined threshold is throttled up or down to match a legacy goal defined for the digital asset used in the video game.

In one implementation, the predefined threshold for the event is defined by a game developer or a player or a game host or a game content sponsor of the video game.

In one implementation, the NFT is maintained for the digital asset used in the video game and regenerated using metadata from multiple gameplay sessions of the video game.

In one implementation, the monitoring the use of the digital asset includes providing a first option to the player to generate the NFT for the digital asset used by the player during the qualifying event when no NFT is available for the digital asset. The first option is provided in response to an event within the video game meeting a predefined threshold to become the qualifying event.

In one implementation, regenerating the NFT includes providing a second option to port the NFT for the digital asset from a second video game. Selection of the second option causes retrieval of the metadata included in the NFT of the digital asset from the second video game in which the digital asset was previously used. The metadata of the digital asset retrieved from the second video game and the metadata of the qualifying event in the video game used to regenerate the NFT for the digital asset.

In one implementation, a timeline of the game play is provided identifying a plurality of qualifying events that have occurred during gameplay of the video game in which the digital asset was used. The plurality of qualifying events includes the identified qualifying event of the video game. Each of the plurality of qualifying events is provided as a thumbnail on the timeline. The timeline provides a visual indication of the legacy of use of the digital asset identified from the metadata included in the NFT. The thumbnail provides access to a video recording of a portion of the gameplay of the video game for the qualifying event in which the digital asset was used.

In one implementation, a timeline of the gameplay is provided identifying a plurality of qualifying events including the identified qualifying event that occurred during the gameplay in which a plurality of digital assets including the digital asset were used. Each qualifying event is represented as a thumbnail on the timeline. The thumbnail provides access to a video recording of a portion of the gameplay of the video game where at least one of the plurality of digital assets was used.

In another implementation, a method is disclosed. The method includes receiving inputs from a player for a video game selected for gameplay. The inputs are used to update game state of the video game and provide gameplay data for rendering at a client device of the player. The gameplay data identifies a game space where the player is currently located in the video game. One or more digital assets available in the game space where the player is located is identified. Each digital asset is associated with a corresponding non-fungible token (NFT) and is identified from metadata included in the corresponding NFT. Details related to the one or more digital assets available in the game space of the player is presented to the player to assist the player in making strategic decisions on the gameplay of the video game. The details are provided using metadata included in the corresponding NFT of the one or more digital assets.

In one implementation, the one or more digital assets are presented on a map representing the game space where the player is located in the video game. The one or more digital assets are presented using visible indicators to allow the player to track the one or more digital assets.

In one implementation, the one or more digital assets are associated with one or more other players. The visible indicators are provided to one or more virtual characters representing the one or more other players to allow tracking of the one or more digital assets of the one or more other players in the game space of the video game.

In one implementation, the visible indicators include any one of pins, balloons, arrows, or markers provided at locations in the game space where each one of the digital assets are located. The visible indicators are color coded in accordance to a type associated with each digital asset.

In one implementation, the video game is a multiplayer game played between the player and the other players. When the player obtains a digital asset owned by a second player, the NFT associated with the second player is automatically transferred from the second player to the player. The automatic transferring includes regenerating the NFT of the digital asset with information related to the player and information related to obtainment of the digital asset from the second player. The digital asset is obtained by any one of a defeating a virtual character representing the second player, or killing the virtual character representing the second player, buying the digital asset from the second player, or trading.

Other aspects and advantages of the disclosure will become apparent from the following detailed description, taken in conjunction with the accompanying drawings, illustrating by way of example the principles of the disclosure.

BRIEF DESCRIPTION OF THE DRAWINGS

The disclosure may best be understood by reference to the following description taken in conjunction with the accompanying drawings.

FIG. 4 illustrates a table identifying use of a game asset in the video game obtained from the metadata maintained in the NFT of the digital asset, in accordance with one implementation of the present disclosure.

FIG. 5 illustrates a table identifying use of a plurality of game assets in the video game obtained from the metadata maintained in the NFTs of the respective digital assets, in accordance with an alternate implementation of the present disclosure.

DETAILED DESCRIPTION

Figure 1:
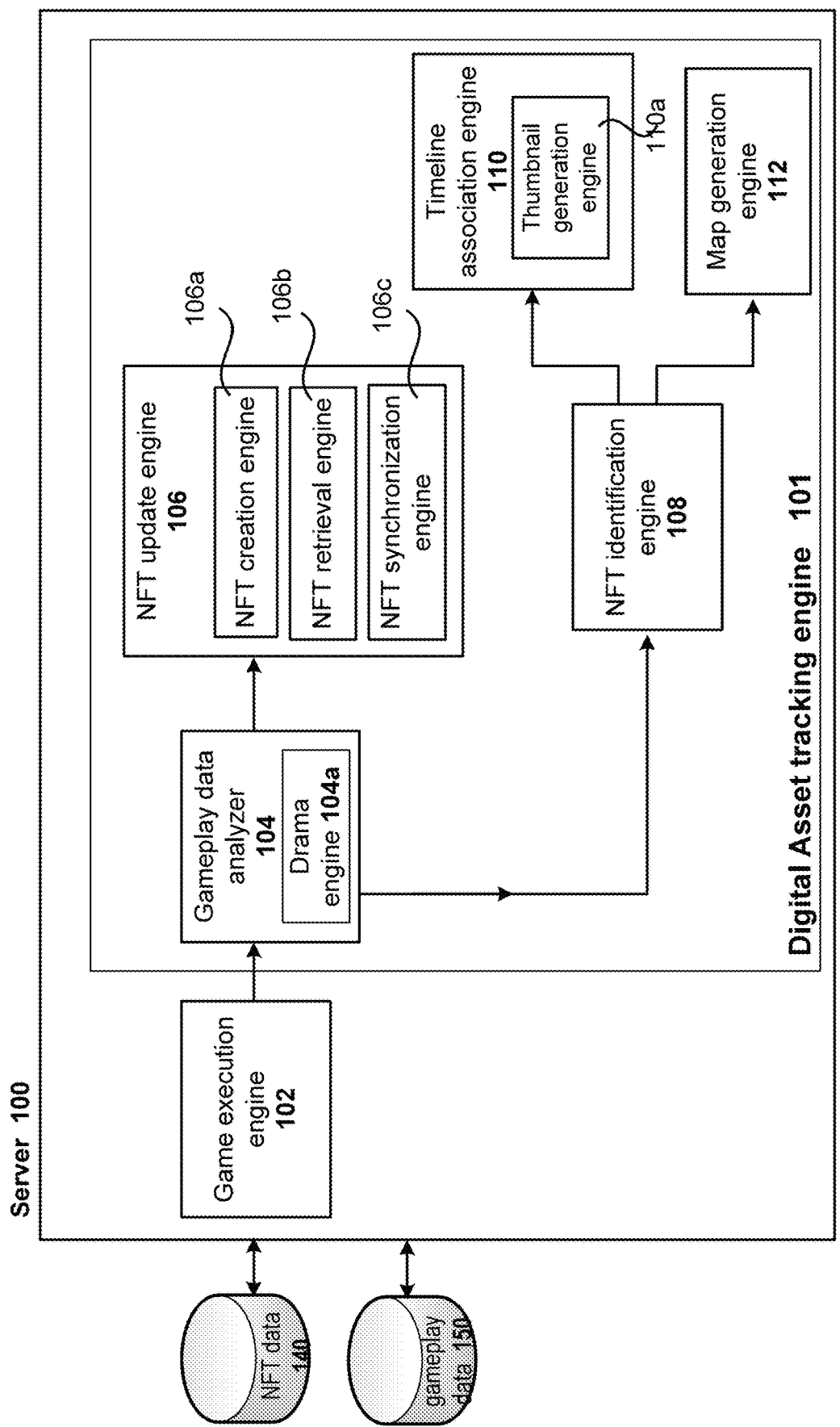
FIG. 1 illustrates a simplified block diagram of a system executing a digital asset tracking engine for generating an NFT for a digital asset used in a video game and tracking the digital asset using the NFT, in accordance with one implementation of the present disclosure.

In the following description, numerous specific details are set forth in order to provide a thorough understanding of the present disclosure. It will be apparent, however, to one skilled in the art that the present disclosure may be practiced without some or all of these specific details. In other instances, well known process steps have not been described in detail in order not to obscure the present disclosure.

Blockchain technology is growing in popularity as it provides a way to have secure digital transactions between two parties without requiring a third party. The blockchain technology maintains an automated digital ledger recording each and every digital transaction, wherein each digital transaction results in the creation of a distinct block that is added to a chain of blocks that make up the transaction. The blockchain representing the various transactions of a digital asset are represented using a non-fungible token (NFT). The NFT for a digital asset can be used to validate the digital asset by verifying authenticity, past history and ownership of the digital asset. The blockchain of the digital asset is stored on multiple servers and used to authenticate the digital asset by ensuring that the data contained in the blockchain on one server is same as the blockchain data contained on a plurality of servers.

The concept of NFT using blockchain technology is extended to the video game by maintaining records of use for each game asset used in the video game. Using the blockchain concept, each use of the game asset is added as a distinct block to the blockchain maintained or created for the game asset. As the game asset gets used more in the video game, more blocks are added to the blockchain. The NFT for a game asset provides sufficient details that can be used to not only verify the authenticity of the game asset, but also to obtain past use history, and past/present ownership of the game asset (also referred to as "digital asset" with respect to the video game), details of game space where the game asset was used, etc. The NFT maintained for a game asset used in a video game is associated with a player currently owning the game asset in the video game and when the game asset is acquired by a new player, the acquisition by the new player is automatically recorded in the NFT by updating ownership of the game asset to the new player. In some implementations, only some of the game assets used in the video game may be associated with an NFT based on their usage in qualifying events that have occurred in the video game. In alternate implementations, each game asset used in the video game may have an NFT associated with them to begin with and based on their usage in qualifying events, the NFT of the game asset may be updated.

The history of use of the game asset recorded in the NFT provides details of the various qualifying game events (i.e., game events that meet a predefined threshold, such as killing a monster in shortest amount of time, defeating monster in first attempt, defeating both monsters in a specific level for first time, etc.) in which the game asset was used either by the player or by other players who currently or previously owned the game asset and during current or prior gameplay sessions, the identity of the player who used the game asset in each qualifying game event, the type of activity performed using the game asset (e.g., defeating the monster, escaping the dungeon, killing a virtual character, etc.), and/or the action(s) that were performed using the game asset (e.g., various types and number of moves performed, etc.), etc.

In some implementations, the history of use of the game asset in the qualifying game events may be presented to the player(s) on a timeline identifying the qualifying game event in which the game asset was used. The timeline may also include a link to a video clip of a portion of the recording of the video game corresponding to the qualifying game event in which the game asset was used. The video clip, when selected, renders a portion of a video recording of gameplay of the video game played by the player in which a qualifying game event occurred and where the game asset was used.

The historical use information provided by the NFT for the game asset may be used to assign a value for the game asset. As the game asset is used in more and more qualifying events, the NFT associated with the game asset is regenerated to include the prior use history and metadata related to the qualifying events, and the value assigned to the game asset may be incremented. The value of the game asset obtained from the NFT based on the history of use, can be used by the players to make strategic decisions during gameplay including whether to own a game asset, which game asset to own, how to obtain the game asset, once acquired, when, where and how to use the game asset during gameplay, etc. For instance, the player may decide to own or acquire the game asset in order to strengthen their arsenal in the video game. In another instance, the player may decide to acquire the game asset as a collectible due to the game asset's unique history as recorded in the NFT. Collecting the game asset may result in the player having an improved standing in the video game.

In some implementations, in order to assist the player strategic decisions on which game asset to acquire during gameplay, game assets with associated NFTs available in the vicinity of the player in the game scene of the video game, may be identified and presented to the player. In some implementations, the game assets with NFTs available in a game scene of the video game in which the player is present, may be presented on a map representing the game scene. In some implementations, the game assets may presented in the map using visual indicators. It should be noted that there may be other game assets without any NFTs associated with them in the vicinity of the player in the game scene of the video game as these game assets were not used during qualifying events to generate the NFTs. In one implementation, only the game assets with associated NFTs may be presented in the map for the player to make strategic decision. The game assets rendered on the map in the vicinity of the player may be acquired by either purchasing or trading or by providing game inputs during gameplay. The game inputs provided by the player may result in the other player or virtual character currently owning or possessing the game asset in getting defeated. In one implementation, a brief history of use or previous use of each game asset identified in the map may also be provided to the player. In one implementation, the brief history or prior use of the game asset may be presented to the player when the player hovers over the respective game asset rendered on the map. In alternate implementation, the map of the game scene may be used to present both the game assets with associated NFTs and game assets without associated NFTs. In such cases, the map may identify the game assets with NFTs (i.e., game assets that were involved in qualifying events) using visual indicators to allow the player to easily identify the game assets with the NFTs. In some implementations, the game assets with NFTs may belong to other players of the video game. In such implementations, the visual indicators may be provided for the virtual characters of the player(s) owning the NFT game asset(s).

An NFT may be created (i.e., minted) for a game asset when the game asset is used in an event that is defined as a qualifying event. As creation and/or updating of the NFT to a blockchain technology takes time and resources, it is more efficient and useful if the NFT is recorded for use of the game asset in qualifying events (i.e., significant events) rather than for each and every event occurring in the video game. In one implementation, use of the digital asset in each and every event occurring in the video game may be recorded in gameplay data while the use of the digital asset in qualifying events may be recorded using the NFT. An event becomes a significant or qualifying event when the event meets a predefined condition or threshold. For example, an event of defeating a particular monster in record time in level 7 may be defined as a qualifying event. In this example, the predefined threshold for the record time may be defined to be 15 seconds. There may be other levels in which the player may have defeated the monster or other monsters within 15 seconds. However, defeating the particular monster in level 7 in less than 15 seconds (e.g., in 12 seconds) may be a significant event as no other player may have reached level 7, let alone defeated the particular monster in record time in this level and the player may have achieved this goal using a particular game asset.

In another example, a first player may have defeated the particular monster in record time (e.g., in 12 seconds) in level 7 and the NFT generated or regenerated for the game asset used in defeating the monster by the first player records this event using metadata of this event. When the player or a second player defeats the same monster in level 7 in 8 seconds using the same game asset, then this event of defeating the particular monster by the player or the second player in 8 seconds is also registered as a qualifying event as the time taken to defeat the monster sets a new record. In another example, a qualifying event may be defined to be defeating the monster in first attempt in level 10. As in the previous example, no player may have, (a) reached level 10, (b) defeated the monster in level 10, and (c) defeated the monster in the first attempt. In yet another example, the qualifying event may be defined to be a first player defeating a second player who is at a certain ranking level. In this example, the first player may be a novice player and the second player may be an expert player (e.g., a player with highest ranking). In this instance, it may be determined that no novice player has ever defeated an experienced (i.e., an expert) player. The events may be defined as qualifying events based on the statistics associated with the events and context of the gameplay, and the predefined thresholds may be defined in accordance to frequency of occurrence of such events based on the statistics. In some implementations, the predefined thresholds may be defined by a game developer, or a game provider, or by a game sponsor or players themselves to make the gameplay of the video game more interesting and engaging.

The historical information recorded for the different game assets (i.e., the details included in the NFTs) are used to identify other game assets with NFTs that are present within each game scene of the video game during gameplay. The other game assets with NFTs may be owned by other players (represented by virtual avatars or virtual characters), or may be associated with one or more virtual characters included in the game scenes of the video game or may be distributed in the game scene or may be introduced into the game scene for capturing during gameplay. The other NFTs may be identified using time and space attributes of the player, time and space attributes of the other players owning certain ones of the game assets associated with NFTs, time and space attributes of certain other ones of the game assets associated with NFTs in the respective game scene. The various game assets with NFTs in the vicinity of the player may be presented in the game scene using visual indicators so that the player may be able to view the available NFTs. In some implementations, based on the context of the gameplay and the event that is currently occurring or schedule to occur in the game scene, certain ones of the game assets that were previously used for the event may be identified and visual indicators provided for those game assets. For instance, a sword or a stick may be relevant to overcome the challenge in the event within the game scene and the sword and/or the stick identified in the game scene may be highlighted by providing visual indicators so that the player can focus on acquiring those game assets that are relevant to overcome the challenge in the game scene than other game assets with NFTs but may not be relevant or useful to overcome the challenge. Identification of the game assets in the game scene, game assets that are relevant to the context of the challenge within the game scene, etc., may be done using machine learning. The information related to the other NFTs may be used by the player to develop gameplay strategies for acquiring the proper game assets in order to achieve a certain goal of overcoming the challenge in the game scene. When the event occurring in the current game scene qualifies to be a significant event (e.g., get through a specific battle in record time or achieve highest score possible in the specific battle, etc.) based on the player meeting or exceeding a predefined threshold defined for the event, the metadata included in the NFT of the game asset used in achieving the significant event and the metadata associated with the significant event in the current game scene are used to regenerate the NFT for the game asset. The regenerated NFT of the game asset records the use of the game asset in the current game scene.

The particular game asset may be owned by a first player and a second player may obtain the particular game asset by defeating the first player or by trading other game assets of the second player in exchange for the game asset or by buying the game asset from the first player. When the ownership of the particular game asset used during a qualifying event changes, the NFT is regenerated to record the change in ownership. Upon acquiring the particular game asset, the second player may use the particular game asset to achieve the event in the current game scene or exceed the goal set by the first player so as to qualify the event as a significant event. In such cases, the regenerated NFT of the particular game asset records the second player's achievement of overcoming challenges in the event, which qualified the event as the significant event. The regenerated NFT provides the use history of the particular game asset used to overcome the challenges in the significant event achieved in the current game scene by the second player. In one implementation, the significant event that the first player achieved in the current game scene using the game asset may be overcoming the challenges in a current game level in 12 seconds, while the predefined threshold time to qualify the event as a significant event was set to be 15 seconds or less. In this example implementation, a subsequent significant event for the current game scene may be defined to be achieving the challenges in the current game scene that exceeds the achievement of the first player (i.e., overcoming the challenges in less than 12 seconds even though the predefined threshold time was set to be 15 seconds. When the second player exceeds the time limit and overcomes the challenges in the current game scene in 10 seconds (i.e., <12 seconds achieved by the first player), the event of overcoming the challenges will be declared as a significant event and the NFT may be regenerated to capture the use of the game asset in achieving the subsequent significant event. In alternate implementation, the subsequent significant event for the current game scene may continue to be when another player overcomes the challenges within the predefined threshold value of 15 seconds. The machine learning may be used to determine when the player achieves a significant event within a current game scene based on the context of gameplay and based on statistics of gameplay of the player(s).

With the general understanding of the invention, specific implementations will now be described with reference to the various figures.

FIG. 1 illustrates a simplified block diagram of a computing system in which an instance of a digital asset tracking engine is executed for creating NFT for a digital asset, such as a game asset in a video game, in one implementation. The NFTs of the game asset are used to track the game asset in the video game where it is used. The computing system maybe a cloud system and the instance of the digital asset tracking engine may be executed on a cloud server 100 within the cloud system. The cloud server 100 may be the same server on which a game execution engine 102 is executing or maybe communicatively connected to a server (100) executing the game execution engine. The game execution engine initiates an instance of the video game that is selected for gameplay. The video game may be a multi-player video game with a plurality of players accessing the same instance of the video game executing on the cloud server 100 or different instances of the video game executing on a plurality of game consoles within the cloud server 100 or different instances of the video game executing on a plurality of cloud servers 100 within the cloud system. The plurality of players may be accessing the different instances simultaneously from different geo locations. In the case where multiple instances of the video game are being executed and accessed, game inputs provided by the players are used to update the game state of the video game and the game state is synchronized across all instances of the video game so that each player is presented with the current game state of the video game.

The game execution engine generates gameplay data that is provided as input to the digital asset tracking engine 101 and is also stored in the gameplay data datastore 150. The gameplay data identifies various events that are occurring within game scene during gameplay based on inputs received from one or more players of the video game. The inputs may be provided by the one or more players using game assets that are owned by the players. The gameplay data and the inputs provided by the one or more players are made available to the gameplay data analyzer 104 of the digital asset tracking engine 101.

The gameplay data analyzer 104 analyzes the gameplay data to identify the various events that are occurring during gameplay of the video game and the statistics associated with the various events. In one implementation, the gameplay data analyzer 104 may engage a drama engine 104a to use the statistical data related to the events to determine if a particular event is a significant event (i.e., qualifying event) that meets a qualification for generating or regenerating an NFT. For example, there may be instances where a player gets to a higher level in record time or scores highest point in a particular level or defeats a monster in record time, or a rookie player who score highest point in a single quarter, etc. The drama engine 104a is configured to identify each event occurring in the game scene and, based on the statistics of the event, qualifies the event occurring in the gameplay as a qualifying event. An event can become a qualifying event more than once. For example, a game event in which a player gets to a higher level in record time is defined as a qualifying event. When a first player uses a game asset and achieves a higher level in record time using a game asset, then the first player is considered to have achieved the goal of the event, which is to get to the higher level in record time—i.e., a qualifying event. The event is defined to be a qualifying event based on the statistics of gameplay determined from the analysis of the gameplay data and the predefined threshold defined for the various events in the video game. The qualifying event is associated with the game asset that was used to achieve the goal of successfully overcoming the challenges of the qualifying event. Now, when a second player achieves the same higher level using the same game asset as the first player but beats the record time set by the first player, then the event of achieving the higher level by the second player using the same game asset now becomes a subsequent qualifying event.

To determine the statistics of gameplay and to define an event as a qualifying event, the drama engine 104a of gameplay data analyzer 104 analyzes the gameplay data and the inputs from the players to identify time and space attributes associated with the gameplay data and the inputs. The time and space attributes of the gameplay data is correlated to the time and space attributes associated with the inputs provided by the players. The space attributes of the gameplay data are used to identify current game scene, a location within the current game scene of the video game where a particular player is located, and an event occurring in the current game scene. The time attributes from the inputs of the particular player are correlated to the time attributes of an event occurring at the time when the inputs of the particular player were received, and together with the space attributes, relevant data, such as the identity of the particular player providing the inputs, the game asset that was used by the particular player to provide the inputs for the event, type(s) of inputs provided, number of inputs provided (e.g., multiple strikes vs. single strike), outcome of the input, etc., are identified. The inputs from the player are used to determine the outcome (i.e., game state) of the video game.

The pertinent data obtained using the time and space attributes of the gameplay data and the inputs of the players, are provided as inputs to an NFT update engine 106 within the digital asset tracking engine 101. The NFT update engine 106 determines if the event is a qualifying event for which an NFT has to be generated, and such determination is done based on the statistics obtained from the gameplay data. An event, such as killing a monster, may have already occurred multiple times within earlier game scenes of the video game. However, based on the statistics of gameplay it may be determined that the monster was killed in a certain level for the first time or within a shortest period of time or in the first attempt. In such case, the killing of the monster event qualifies as a qualifying event. When it is determined that the event is a qualifying event, then the NFT update engine 106 determines if an NFT has already been created for the game asset that was used in the event of the video game. If no NFT is available for the game asset, then an NFT creation engine 106a within the NFT update engine 106 is engaged to generate (i.e., mint) an NFT for the game asset used by the player during the event. Metadata related to the event is used to create the NFT. The newly minted NFT for the game asset is associated with the qualifying event and the player, so as to build a legacy of use for the game asset within the video game. The newly minted NFT for the game asset is stored in a NFT data datastore 140.

If, on the other hand, an NFT already exists for the game asset, and the event occurring in the game scene in which the player is using the game asset is determined to be a qualifying event, then the NFT for the game asset is regenerated to include details from the qualifying event that the player achieved in the current game scene. In this case, the NFT update engine 106 may engage an NFT retrieval engine 106b to first retrieve the metadata included in the NFT of the game asset from the NFT data datastore 140 and then regenerate the NFT for the game asset using the metadata retrieved from the NFT data datastore 140 and the metadata of the qualifying event achieved in the current game scene, using the blockchain technology. The regenerated NFT captures the legacy of use of the game asset and is stored in the NFT data datastore 140.

The NFT created (i.e., generated) and/or regenerated is synchronized across all servers where the NFT data for the game asset is stored. An NFT synchronization engine 106c of the NFT update engine 106 is used to perform the synchronization of the NFT of the game asset. The NFT data for the game asset may be synchronized at an individual video game level or collectively across all video games. In one implementation, the game asset may be ported (i.e., transferred) from one video game to another video game and the NFT synchronization engine 106c may synchronize the NFT data associated with the game asset across all the video games in which the game asset may be used. In one implementation, the different video games may be implemented on different game platforms. In such implementation, the metadata to include in the generation or regeneration of the NFT for a game asset in one video game is standardized and includes only essential data that can be used to uniquely identify legacy of use of the game asset in all game platforms. The synchronization of essential metadata across other video games running on different game platforms may be done using appropriate application programming interfaces (API).

In addition to generating NFT data for a game asset, the statistical data, identified by the drama engine 104a from the analysis of gameplay data, may be used to identify various game assets with NFTs within a game scene where the player is present. An NFT identification engine 108 of the digital asset tracking engine 101 may be used to identify the various game assets with NFTs within the game scene and provide visual indicators on the game assets itself or on a virtual character who possesses the game assets. The player may be able to make strategic decisions on the gameplay using the information related to the identified game assets within the game scene. For example, the game assets identified within the game scene may identify two different game assets with NFTs that were used to achieve different significant events in the video game. The player may use history of use details included in the NFT data of the game assets in the vicinity of the player to determine if they need to acquire one or more of the game assets for assisting the player with the challenge, and to identify which game asset to acquire, which other player to interact with to obtain the identified game asset, which game asset to use for overcoming specific challenges within different game scenes, which game asset to acquire to improve their overall game standing, etc.

In one implementation, the various NFT associated game assets within the game scene may be presented to the player on a map representing the game scene. The map with the NFT associated game assets may be dynamically generated for the player based on statistics of current gameplay of the player. For instance, the player maybe playing in a manner where the probability of an event qualifying as a qualifying event is high, wherein the probability of occurrence of the qualifying event may be determined based on the statistics collected during current gameplay. In one implementation, the analysis of gameplay data to identify statistics of gameplay and determining qualifying event may be performed using machine learning algorithm. Based on the likelihood of occurrence of the qualifying event, the digital asset tracking engine 101 may examine the game assets currently possessed by the player in the video game and the game asset(s) the player likely needs to acquire in order to complete the challenge that would qualify the event as the significant event. The digital asset tracking engine engages a map generation engine 112 to dynamically generate the map of the game scene and identify location of the game assets with NFTs that the player needs to acquire, within the game scene to assist the player in determining which one of the game assets to acquire and to strategize their gameplay for acquiring the game asset. The map may not only identify the location of the game assets (i.e., virtual characters who possess the game asset or location(s) within the game scene) but may also provide attributes of the identified game assets with NFTs, such as which player currently owns the game asset, which game scene and which significant event the game asset was used, which player used the game asset to overcome the challenge that qualified the event as a significant event, etc. The attributes of the game asset are obtained from the metadata of the game asset included in the NFT data of the game asset. The attributes of the game asset may be provided as informational message in a pop-up window rendered in a portion of the game scene or in a specific portion of the display screen defined by the player to allow the player to view the legacy of the game asset and make informed decisions.

In another implementation, instead of or in addition to the map, the attributes of the game asset used during significant events may also be presented in a timeline to the player to provide a quick view of the qualifying events in which the game asset was used. In this implementation, the timeline identifies qualifying or significant events that were accomplished using only the game asset. In one implementation, a timeline may be generated for each game asset that has some legacy of use in the video game or alternately in another video game. In another implementation, the timeline generated for the video game may include significant events of more than one game asset used by different players in the video game. A timeline association engine 110 of the digital asset tracking engine 101 is engaged to generate the timeline identifying the qualifying or significant events that have occurred during the gameplay of the video game. In one implementation, the timeline may be generated for current gameplay session of the video game and include the qualifying events that have occurred during gameplay in which the game asset was used. As the gameplay continues, additional qualifying events may occur in which the game asset is being used and the timeline may be dynamically updated to include the additional qualifying events. In alternate implementation, the timeline may include qualifying events from previous gameplay sessions of the video game. In addition to identifying the qualifying events that have occurred in the video game, the timeline may also include video clips of recording of a portion of the gameplay of the video game when the qualifying game event occurred. The video clips may provide the player with information on how the game asset was used, by whom and for which game event.

In one implementation, the video clips may be provided on the timeline as thumbnails. A thumbnail generation engine 110a within the timeline association engine 110 may be used to generate the thumbnails for the video clips identified by the NFT identification engine 108. The thumbnails provide interactive links to access the respective video clips of gameplay. It is noted that presenting the qualifying events in which the game asset is used in a timeline with thumbnails of video clips is one format adopted for presenting the qualifying events and that other formats may also be adopted.

Figure 2:
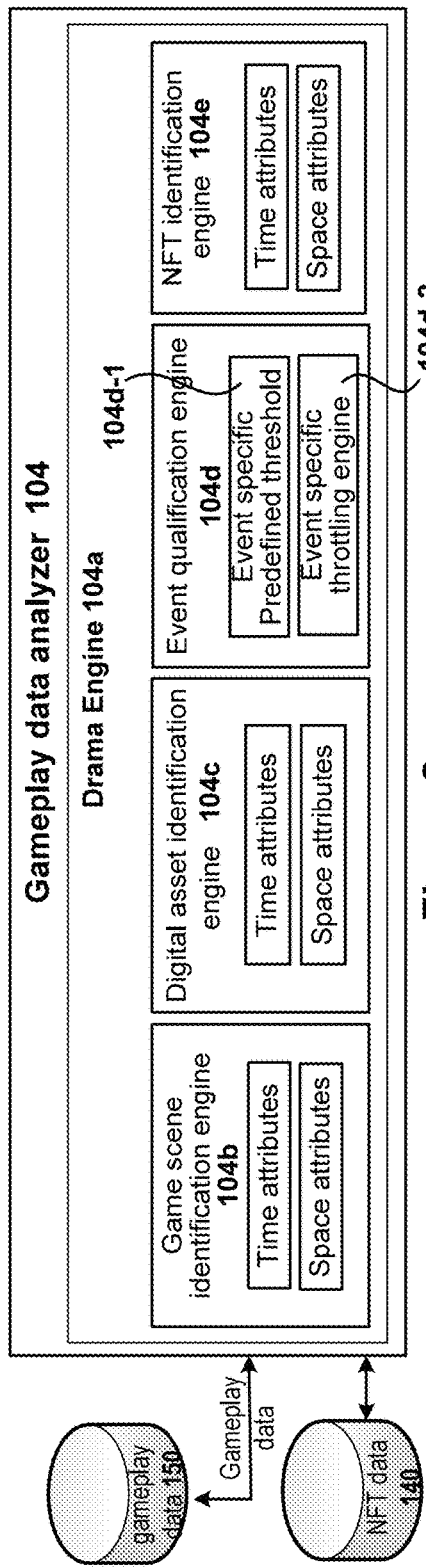
FIG. 2 illustrates some of the sub-modules of a gameplay data analyzer of the digital asset tracking engine of FIG. 1, in accordance with one implementation of the present disclosure.

FIG. 2 illustrates some of the sub-modules of the drama engine 104a in the gameplay data analyzer 104 used to analyze the gameplay data to identify statistics that qualify events as significant events (also referred throughout as "qualifying events") where particular game assets were used for which NFT data needs to be recorded. The drama engine 104a is configured to keep track of the statistics of gameplay in the context of the video game and qualify events as significant events. An event by itself may not be trophy worthy to keep track of or meaningful (i.e., qualifying or significant event) on its own. However, based on the context of the gameplay and the statistics collected during the gameplay, the event may become significant during gameplay. For example, a player getting to a higher level may not be trophy worthy or meaningful on their own. However, when the player is able to get to a higher level in record time, then such achievement of the player is deemed to be a significant event. The statistics collected during gameplay are used to determine when an event becomes or qualifies to become a significant event. In another example, a player defeating a monster in a particular level may not be meaningful on its own. However, if the player defeats the monster in the particular level in a record time, then the event of defeating the monster in the particular level becomes a significant event. Conditions for qualifying an event as a significant event may be defined for the video game and predefined thresholds may be set for the different conditions based on the context of the video game and statistics collected during gameplay.

The drama engine 104a includes at least a game scene identification engine 104b, a digital asset identification engine 104c, an event qualification engine 104d and an NFT identification engine 104e. The aforementioned sub-modules are provided as mere example and that fewer or additional sub-modules may be envisioned within the drama engine 104a. In one implementation, the drama engine 104a uses the gameplay data to identify a game scene in the video game in which the player is currently located, using the game scene identification engine 104b. The game scene identification engine 104b analyzes the gameplay data retrieved from the gameplay data datastore 150 to identify time attributes and space attributes associated with the gameplay data. The time and space attributes are used to identify a game scene where the player is located. When more than one player is involved in the gameplay session of the video game, the game scene identification engine 104b uses the time and space attributes to identify location of each player in the game scene. All the players may be present in a single game scene or may be present in different game scenes at any given time.

In addition to identifying the game scene of a player, the drama engine 104a may be used to identify a game asset (i.e., digital asset) that was used in performing a challenge that qualifies the challenge as a significant event, in one implementation. The game asset may be a sword, a hammer, a bow, a disk, etc., owned by a player and used to defeat an enemy or overcome a challenge in the game scene. The game asset may have special powers or may be wielded in special ways in order to provide the desired result—i.e., of defeating the enemy or overcoming the challenge. A digital asset identification engine 104c within the drama engine 104a is used to identify the game asset by correlating the inputs provided by the player with the time and space attributes of the gameplay data, wherein the inputs identify the type of game asset used to provide the input, the number of attempts by the player using the game asset to achieve the desired result, result of each attempt, etc.

An event qualification engine 104d of the drama engine 104a uses statistical data identified from the analysis of the gameplay data and the inputs of the player to identify an event occurring in the video game and to determine if the identified event qualifies as a significant event (i.e., qualifying event) that requires an NFT to be generated. The event qualification engine 104d may refer to conditions and corresponding event specific predefined threshold 104d-1 defined for each event to determine if the event qualifies to be the significant event. Each event occurring in the video game may have a distinct threshold set in the video game based on the context, level and/or game scene. For example, capturing a monster may have a particular threshold, which might be different from a threshold defined for defeating a player, which might be different from a threshold defined for destroying an enemy base, etc. In some instances, the same event may have different thresholds defined in different game scenes. Based on the statistical data collected from gameplay data, the event qualification engine 104d identifies the event as a qualifying event or not. If the event is a qualifying event, then the event is flagged as such and this information is included with the statistical and other relevant data provided as input to the NFT update engine 106.

An event specific throttling engine 104d-2 may be used by the event qualification engine 104d to throttle the predefined threshold used to qualify an event as a significant event, in one implementation. The throttling may be done dynamically for a particular event and may be based on the statistical data collected from the gameplay of the video game. For instance, an event, such as capturing a monster in level 8 of the video game in record time, may have a threshold that defines the record time to be 10 seconds or less. A first player may capture the monster in 10 seconds in level 8, a second player playing the same level in the video game after the first player may capture the same monster in 9 seconds, and third-fifth players playing the same level of the video game after the first and second players may each capture the same monster in 7 seconds. Based on the number of players (i.e., players 1-5) and frequency at which the players are able to successfully capture the monster in level 8 at or below the predefined threshold, the predefined threshold for the event may be dynamically throttled to make the threshold more stringent (e.g., throttled to 8 seconds or less). On the other hand, if the 2 or less number of players are able to capture the monster in level 8, then the threshold may be made more lenient (e.g., throttled to 15 seconds). In this example, the event specific throttling engine 104d-2 may be used to examine the statistical data for the particular event and perform a dynamic throttling of the predefined threshold that can be used to determine the event as a qualifying event for generating the NFT for a game asset.

In one implementation, the drama engine 104a may determine if an NFT exists for the game asset identified by the digital asset identification engine 104c. The time and space attributes obtained from the analysis of the gameplay data may be used to determine the event and the game asset that was used in the event. An NFT identification engine 104e may be used to query the NFT data datastore 140 to determine if an NFT exists for the identified game asset. If the NFT exists for the game asset, then the metadata included in the NFT data of the game asset is retrieved and provided to the NFT update engine 106 with the statistical and other relevant data from the gameplay data analyzer 104.

Figure 3:
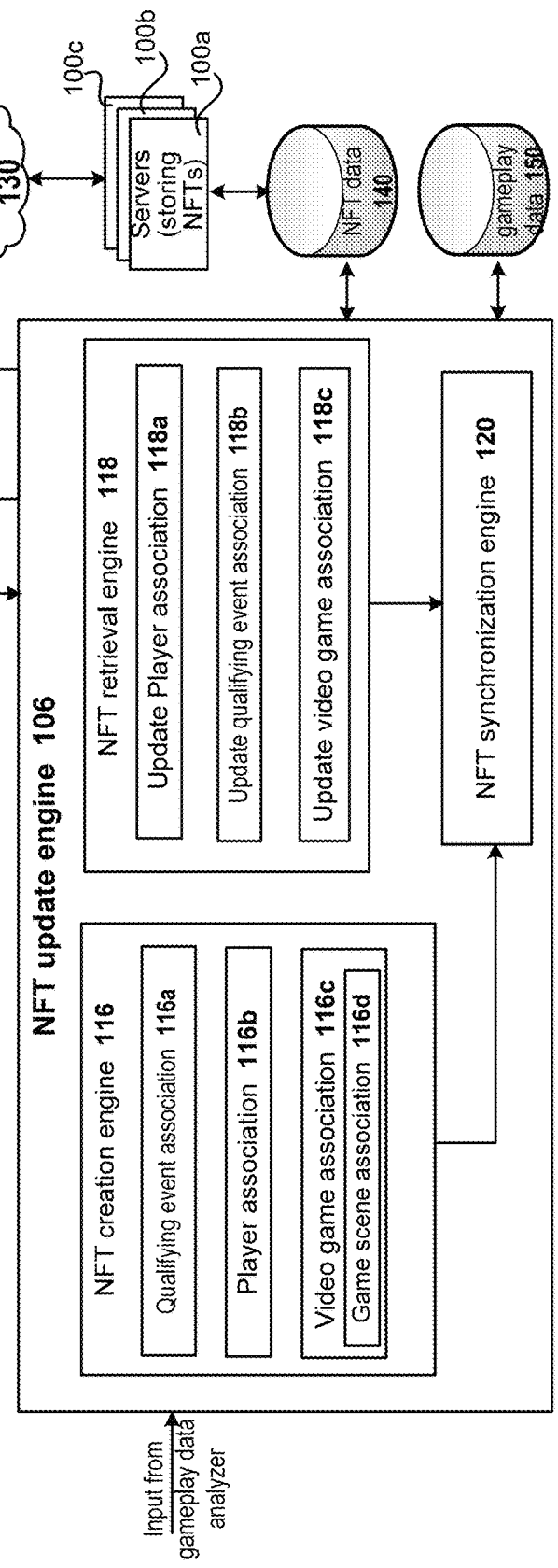
FIG. 3 illustrates some of the sub-modules of a NFT update engine of the digital asset tracking engine of FIG. 1, in accordance with one implementation of the present disclosure.

FIG. 3 illustrates some of the sub-modules of the NFT update engine 106 used to generate or regenerate NFT data for a particular game asset used in a qualifying event of the video game, in one implementation. The NFT update engine 106 receives the input from the gameplay data analyzer 104 and either engages an NFT creation engine 116 for generating an NFT for a game asset that was used in a qualifying event that just occurred in the video game or use an NFT retrieval engine 118 to retrieve metadata of the NFT already generated for the game asset and regenerate the NFT data for the game asset used in the qualifying event. When there is no NFT data available for the game asset used in a qualifying event, the NFT creation engine 116 generates an NFT data record for the game asset using blockchain technology. The NFT for the game asset is generated using the metadata of gameplay pertaining to the qualifying event in which the game asset was used. The metadata included in the NFT provides sufficient details to identify and validate the game asset and creates legacy for the game asset. The qualifying event association engine 116*a* associates the generated NFT data with the qualifying event. The NFT data for the game event is also associated with the player who participated in the game event and provided the inputs using the game asset to accomplish the challenge. A player association engine 116*b* is used to identify the player and associate the NFT data of the game asset to the player.

The NFT data generated for the game asset is associated with the video game using a video game association engine 116*c*. The video game includes the game scene where the game asset was used to accomplish the qualifying event. A game scene association engine 116*d* is used to associate the NFT data to the particular game scene where the qualifying event occurred in which the game asset was used during gameplay. The NFT data generated for the game asset using the blockchain technology includes details of the video game in which the game asset was recently used, the game scene in the video game where the game asset was used, the qualifying event that occurred in the game scene, the game asset that was used to overcome the challenge in the qualifying event and the player that provided the input using the game asset. The newly generated NFT data for the game asset is provided to a NFT synchronization engine 120 as input to allow the NFT data to be synchronized across multiple servers where the gameplay data of the video game and the NFT data for the game asset is stored.

In the case where the NFT is already generated for the game asset, the NFT retrieval engine 118 is used to query the NFT data datastore 140 and retrieve the metadata included in the NFT of the game asset used during the qualifying event in the video game. The retrieved metadata of the game asset and metadata of the qualifying event are used to regenerate the NFT for the game asset. The regenerated NFT is written to the blockchain of the game asset as a new entry, wherein the new entry adds the metadata of the qualifying event to the existing metadata identifying prior use (i.e., legacy of use). The metadata for the qualifying event is obtained from statistical data and other information provided by the drama engine 104*a*. The regenerated NFT provides a complete history of use of the game asset including details of prior use as well as the current use of the game asset in the video game. The prior use of the game asset may be from only the current gameplay session or may be from prior gameplay sessions of the video game. Further, the prior use of the game asset maintained in the NFT may be player-specific or video-game-specific or game-asset-specific. The player-specific details capture the history of use of the game asset when the game asset was in the possession of the player and used in the video game. The video-game-specific details capture the history of use of the game asset when used within the video game identified in the NFT. The game-asset-specific details capture the complete history of use of the game asset by multiple players, in different video games, and in multiple gameplay sessions of each of the different video games where the game asset is used. When the prior use identified the game asset was used by other players and the current use identified the use of the game asset by the player, an update player association engine 118*a* may be used to update the player information and the association of the current player to the game asset when the NFT for the game asset is regenerated. An update qualifying event association engine 118*b* is used to update the qualifying event information and the association of the game asset to the qualifying event when regenerating the NFT to record the latest use of the game asset in the qualifying event. When the immediate prior use recorded in the metadata of the NFT retrieved for the game asset identified a second video game, and the current use of the game asset was in the video game (i.e., a first video game that is different from the second video game), an update video game association engine 118*c* is used to update the video game information and to associate the game asset to the video game when regenerating the NFT to record the latest use of the game asset. The metadata included in the regenerated NFT of the game asset is forwarded as input to the NFT synchronization engine 120 as input.

The NFT synchronization engine 120 receives the metadata from the generated NFT for the game asset provided by the NFT creation engine 116 or the metadata from the regenerated NFT for the game asset provided by the NFT retrieval engine 118 and synchronizes the metadata of the generated or regenerated NFT across all the servers that are storing the NFTs for the game asset. The synchronization of the NFT data with other servers may be through API calls, and the NFT data may be transmitted to the other servers via a network connection, such as Internet 130, using network protocols. The game asset may be used in other video games that are executing on different platforms that use different data transmission protocols. Consequently, the metadata of the generated or regenerated NFT capturing the history of use, including the current use, of the game asset may be standardized using the logic in the NFT synchronization engine 120 so that the metadata can be easily and properly interpreted on other platforms. The standardized metadata of the NFT is then transmitted through appropriate APIs. The NFT data transmitted by the NFT synchronization engine 120 is updated to the NFT data datastore 140 maintained across different servers 100*a*-100*c*. The updated NFT data provides sufficient information related to the game asset that can be used to validate the history and ownership of the game asset.

FIG. 4 illustrates a table of example qualifying events in which the game asset was used and for which the NFT of the game asset was generated or regenerated, in one implementation. The table identifies the qualifying events in which a single game asset (e.g., a sword) was used. The details provided in the metadata included in the NFT can be used for tracking the legacy of use of the single game asset. The table identifies details, such as identities of the video game, the game level, the game scene within the game level, the player who owned the game asset, the qualifying event where the game asset was used, and participants of the qualifying event. Of course, the aforementioned details are provided as mere examples and should not be considered exhaustive. Other details may also be included in the NFT data. In this implementation, the game asset is shown to be used in video game 1 and the legacy identifies the different players who owned and used the game asset to overcome challenges within the various qualifying events occurring in different game scenes and in different game levels. In one implementation, the legacy of use of the game asset may be based on one gameplay session of the video game. In another implementation, the legacy of use of the game asset may be based on multiple gameplay sessions of the video game.

FIG. 5 illustrates a table generated from the metadata included in the NFT for different game assets in different video games maintained in NFT data datastore identifying qualifying events in which challenges were successfully overcome using different game assets, in one implementation. In this implementation, some of the game assets used in video game 1 are shown to be also used in video game 2. This may due to a particular game asset used in a first video game having been successfully ported (i.e., transferred) to a second video game for use in overcoming challenges in the second video game. The porting of game assets to different video games may be possible when the different video games are setup to allow such porting of game assets. The video games that are setup to allow such porting may be executing on one game platform (i.e., having its own gameplay protocol) or may be executing on multiple game platforms. Allowing porting of the game assets between video games would make the gameplay of such video games much more interesting, exciting and personal to a player as it feels the player is bringing their own arsenal from one video game to play in other video games. The porting may be done based on explicit instruction from a player. For instance, an option may be provided to the player at the beginning of a gameplay session of video game 2 and as part of gameplay session setup, for example, or at the end of a gameplay session of the video game 1 as part of completion of gameplay session or at any other time. The player's selection of a game asset to port and the video games to port from and port to would initiate the porting of the game asset. The game asset ported from a first video game to a second video game, based on the player's explicit instructions, will be available to the player as soon as the player accesses the second video game or after successful porting of the game asset.

In one implementation, the game asset that a player can select to port from video game 1 may have to be in the possession of the player in video game 1 in order to allow porting. In such implementation, the option to port may be provided along with a list of the game assets that the player currently owns for player selection for porting. In alternate implementation, the player may be allowed to select any game asset available to the player within a video game to port (i.e., transferred) to another video game to allow gameplay using the game asset. In this implementation, the game asset that the player selects to port may have to be setup for porting, and the option to port may include a list of the game assets that the player can select from for porting. FIG. 5 shows an example wherein the video games 1 and 2 have been designed to allow portability of game assets, and in response to the respective player's selections, a doublebladed lightsaber that player 1 owned was ported from video game 1 into video game 2 by player 1, and magical sword that player 2 owned was ported from video game 1 into video game 2 by player 2. The transferred game assets will be available to the respective players during gameplay of video game 2. It should be noted in the above example that even though the transferring (i.e., porting) of game assets have been shown to be from video game 1 to video game 2, the transferring can happen in the other direction—i.e., from video game 2 to video game 1. Consequent to the transferring of the game assets to video game 2, the NFTs associated with those game assets are regenerated to reflect the change in the video game to which the respective game assets are associated (i.e., from video game 1 to video game 2). The metadata of the regenerated NFT includes an identity of the player who initiated the transfer of each game asset, the video game identity from and to which the game asset is transferred, etc. In one implementation, a first player may port a game asset that they won or acquired in video game 1 to video game 2 and additionally transfer the game asset to a second player to allow the second player to use in video game 2. In another implementation, a first player may port a game asset that they won or acquired in video game 1 to a second player within the video game 1. In the above two implementations, upon successful porting of the game asset to second player in video game 2 or 1, the second player may be able to access and use the game asset for gameplay of the respective video game. Once again, upon detecting change in the video game and/or the player to associate for the game asset, the NFT data for the game asset is regenerated to reflect the current ownership of the game asset and the video game where it will be used.

When the transferred game assets are used during qualifying events in the video game 2, for example, the NFT data of the respective game assets are regenerated to include the metadata associated with the use of the respective game assets thereby adding to the legacy of the respective game assets. The legacy of use (i.e, use history) can be used to determine the various video games, the various game scenes, the various qualifying game events that the game assets can be used in and/or were used by the different players, and the blockchain technology used in the generation and/or regeneration of the NFT data enables such tracking of use of the game assets.

Figure 6:
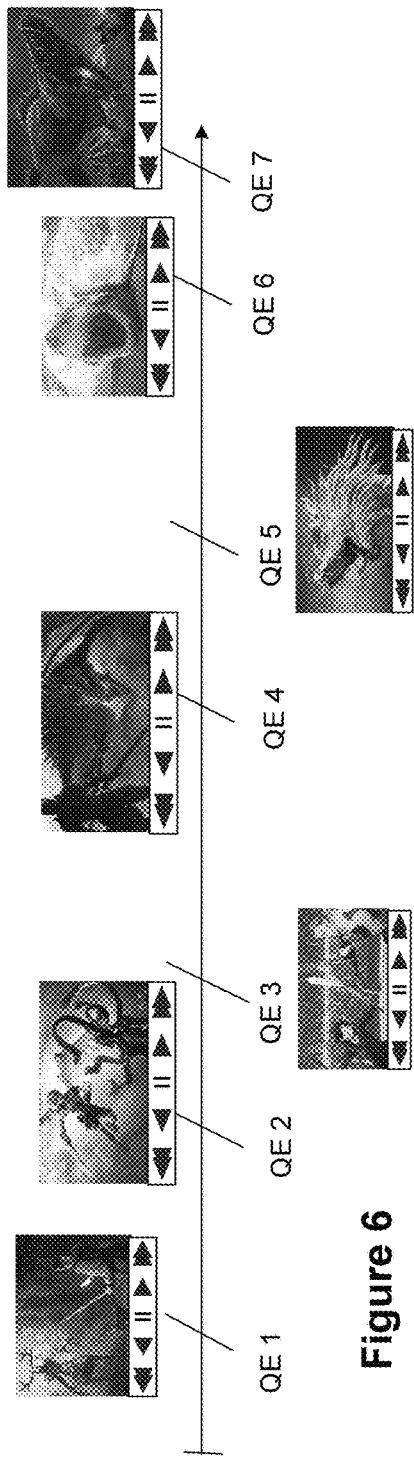
FIG. 6 illustrates a timeline of qualifying events that have occurred in a video game during gameplay in which game assets associated with NFTs were used and video clip of the qualifying event, in accordance with one implementation of the present disclosure.

FIG. 6 illustrates a sample timeline generated for a video game identifying the qualifying events in which a game asset was used by one or more players during gameplay, in one implementation. The game asset may have been in the possession of one player or may have been owned by more than one player during the course of gameplay either through winning, trading, buying or defeating an enemy or virtual character or player who was in possession of the game asset. The timeline provides a quick view of the qualifying events in which the game asset was used. The timeline also provides a video clip of a portion of recording of the gameplay capturing each qualifying event in which the game asset was used. The video clip may be provided as a link or as an interactive clip, which may be designed to render the portion of the recording of the gameplay for the qualifying event in response to interaction from the player or other users (e.g., spectators) at the video clip. In one implementation, the interaction may be explicit selection action or a hovering or mouse-over action. The timeline of FIG. 6 shows seven qualifying events. In one implementation, the timeline may be generated for a current gameplay session of the video game, and the qualifying events and the video clips of the qualifying events may be identified and included at appropriate time slots in the timeline as and when the qualifying events were completed. In this implementation, the timeline may be generated on-the-fly and dynamically updated during the current gameplay session of the video game. In alternate implementation, the timeline may include qualifying events and the video clips of qualifying events in which the game asset was used during prior gameplay sessions. The details provided in the timeline, in this implementation, may be to inform the player all the qualifying events in which the game asset was used.

Figure 7:
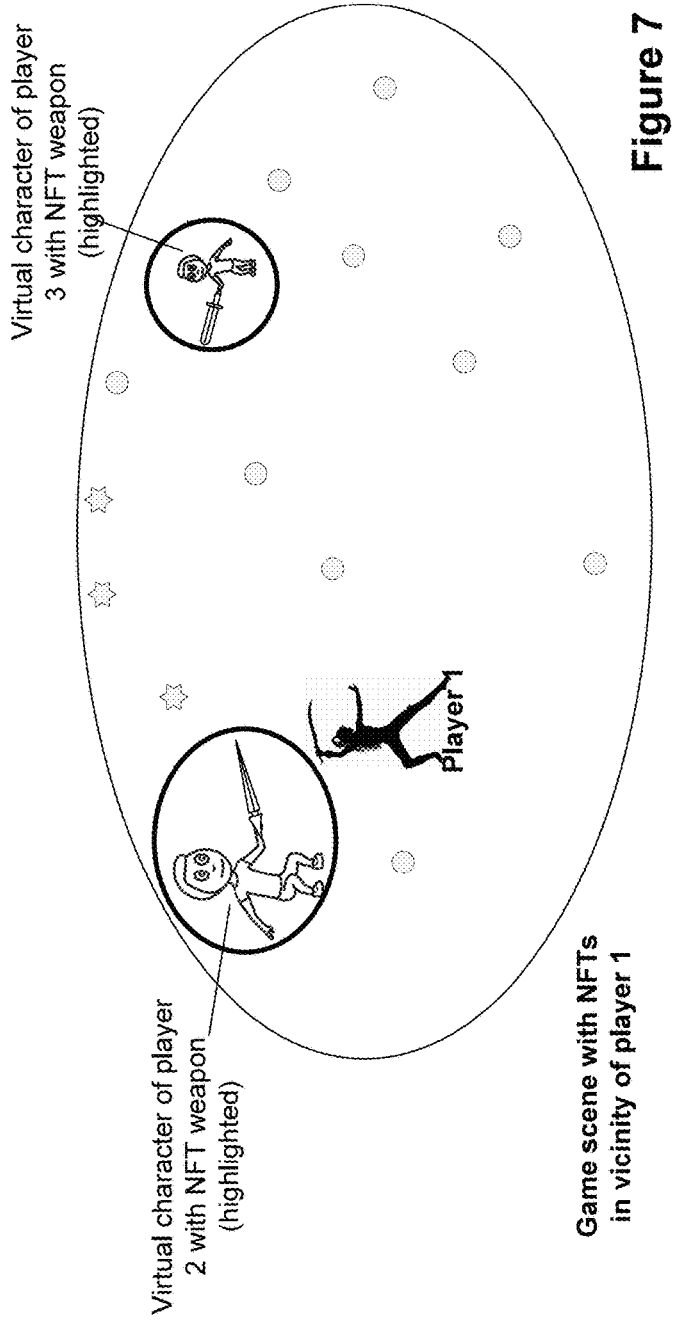
FIG. 7 illustrates a map of game space of a video game identifying NFTs available in a vicinity of a player located within the game space, in accordance with one implementation of the present disclosure.

FIG. 7 illustrates a map of a game scene of the video game in which a player (e.g., player 1) is interactively playing, in one implementation. The NFT data collected for the various game assets during gameplay of a video game include the time and space attributes to identify the different game assets with associated NFTs that are in the vicinity of the player 1. Each game asset identified in the vicinity of player 1 may be associated with another player, a virtual character in the video game or randomly located or made available within the game scene of the video game. In one implementation, the map may identify the location of the game assets owned by other players that may be relevant to the player for current gameplay session. The relevant game assets may be identified based on the context of the game scene in which the player is located and on current statistics collected from the gameplay of the video game. In the example map illustrated in FIG. 7, two relevant game assets with NFTs are identified in the vicinity of player 1 and are shown to be associated with players 2 and 3 respectively and the remaining game assets are identified to be distributed in the game scene. The game assets with associated NFTs may be presented with visual indicators to draw the attention of player 1 toward the game assets. For example, as shown in FIG. 7, the relevant game assets that are in the possession of players 2 and 3 are highlighted to inform player 1 of the existence of the two relevant game assets that the player 1 may be able to use during gameplay. Player 1 may be able to use the location information of the various game assets in the game scene to strategize their next moves in the gameplay. For instance, player 1 may determine if they need to acquire one or both of the relevant game assets to assist them to survive or overcome the challenge in the current level, which one of the two relevant game assets to acquire, mode of acquiring one or both the relevant game assets (e.g., defeat the second and/or third player, trade or buy from the second/third player, etc.), acquire the game asset as a collectible, etc. The NFT provides sufficient history and tracking data that can be used to provide information related to the historical game events in which the various game assets are or were used so as to allow the player to make informed decisions in gameplay in relation to acquiring or trading the various game assets.

Figure 8:
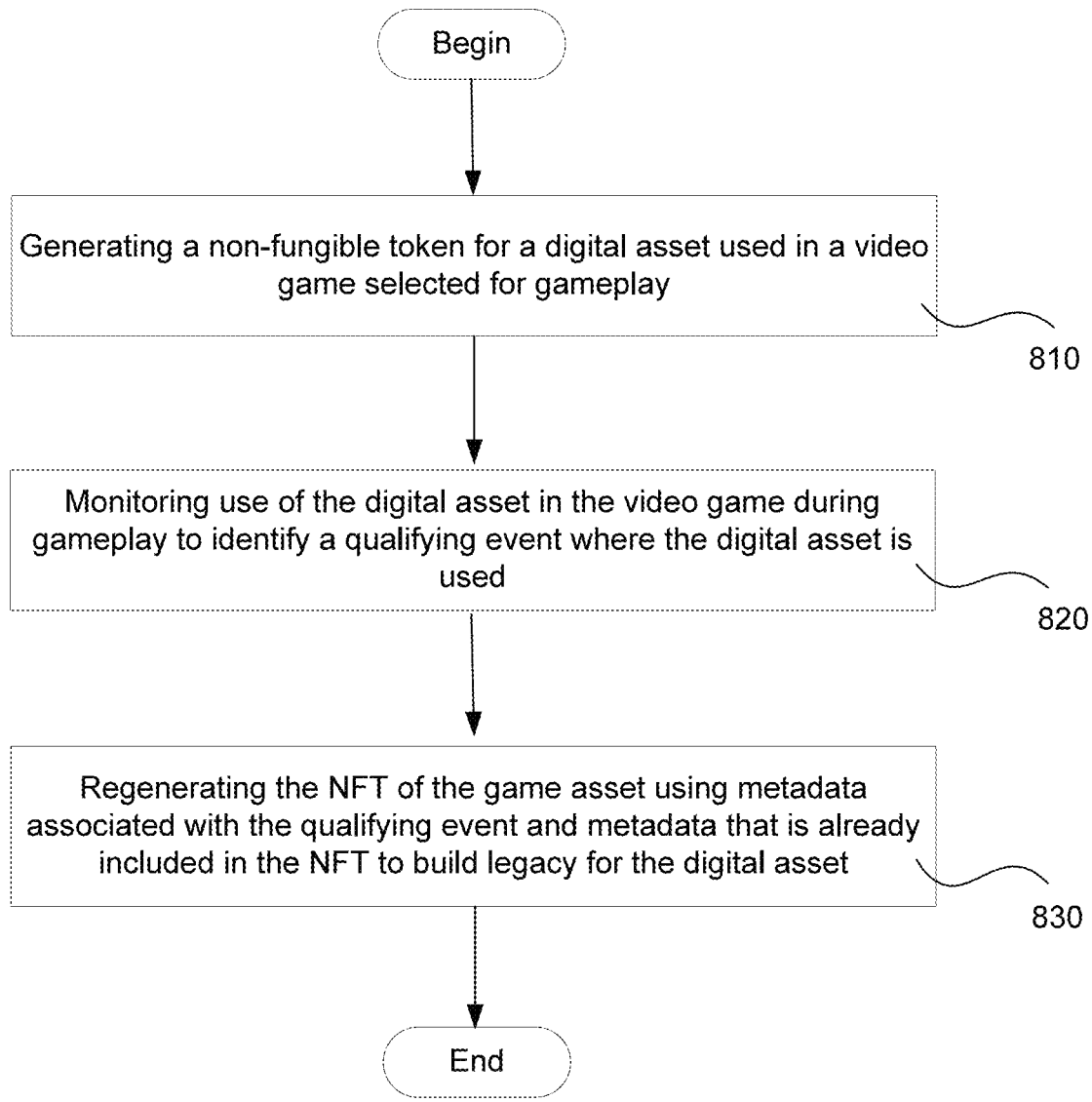
FIG. 8 illustrates flow operations of a method used for generating NFTs for digital assets and tracking use of the digital assets using the NFTs, in accordance with one implementation of the present disclosure.

FIG. 8 illustrates various flow operations of a method for tracking use of a game asset in a video game, in one implementation. The method begins at operation 810 wherein a non-fungible token (NFT) is generated for the game asset used in the video game. The NFT is generated using blockchain technology. The generated NFT is transmitted to different servers via network, such as the Internet, and stored on different servers. Use of the game asset in the video game is monitored to determine when the game asset is used in a qualifying event, as illustrated in operation 820. The game asset may be used to overcome various challenges in the video game. When the game asset is used in a game event that qualifies the game event as a qualifying or significant event, the NFT of the game asset is regenerated using metadata associated with the qualifying event, as illustrated in operation 830. The regenerated NFT of the game asset includes the metadata that was included in the generated NFT and the metadata of the qualifying event that currently occurred in the video game. The regenerated NFT maintains the legacy of use of the game asset in the video game, which can be used by the player to make strategic decisions in the gameplay.

Figure 9:
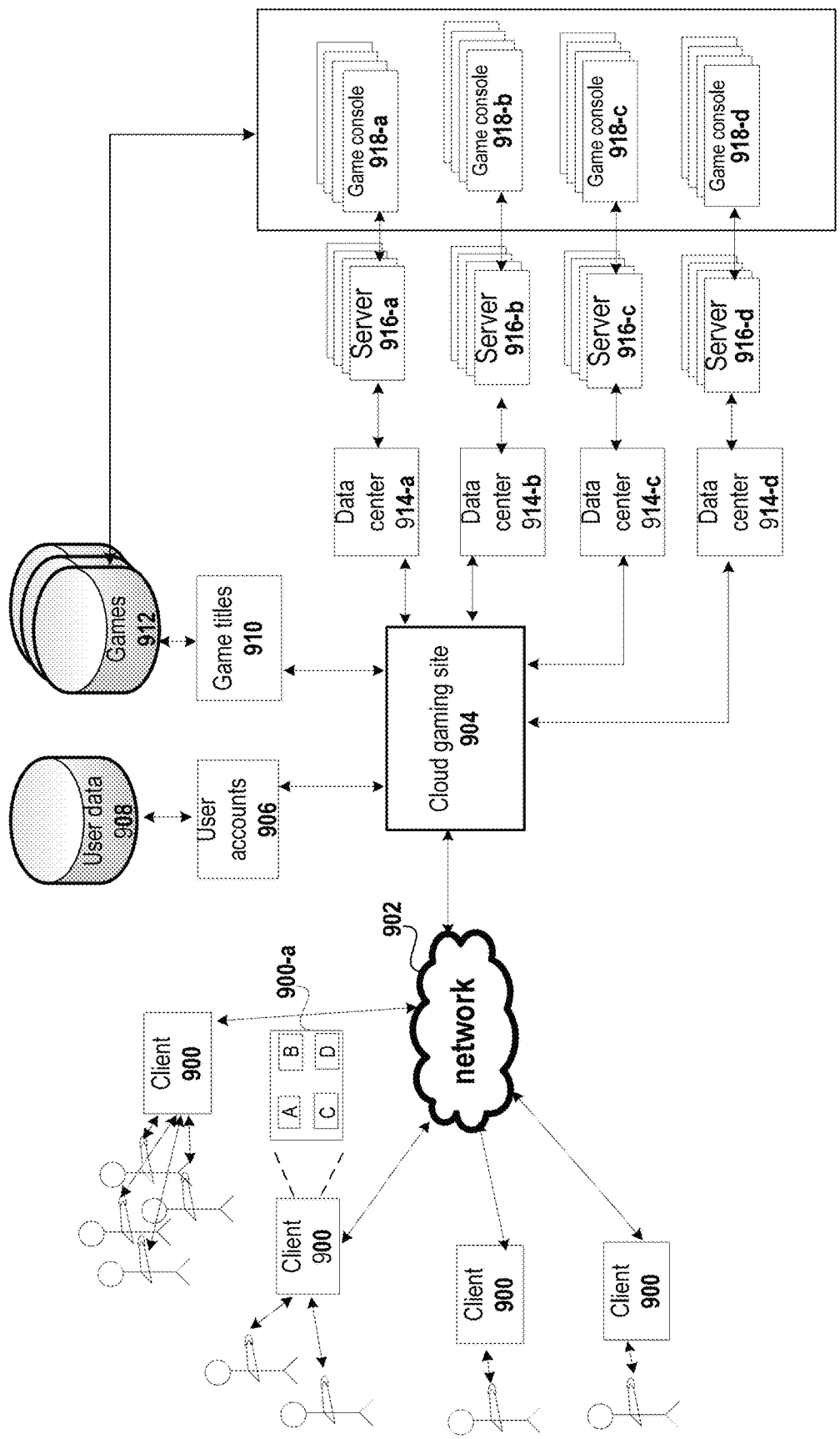
FIG. 9 illustrates a simplified block diagram of a cloud gaming site in which a cloud server used for generating NFTs for digital asset used in a video game and tracking use of the digital asset, in accordance with one implementation of the present disclosure.

FIG. 9 illustrates an exemplary system used to load game files for a game available through a cloud gaming site. The system includes a plurality of client devices 900 that are communicatively connected to the cloud gaming site 904 over a network 902 (130 of FIG. 3), which can include a LAN, wired, wireless, cellular (e.g. 4G, 5G, etc.), or any other type of data network, including the Internet. When a request to access the cloud gaming site 904 is received from a client device 900, the cloud gaming site 904 accesses user account information 906 stored in a user data database 908 to identify a user associated with a client device through which the request is initiated. In some embodiments, the cloud gaming site may also validate the identified user in order to determine all the games the user is authorized to view/play. Following user account identification/validation, the cloud gaming site accesses a game titles data 910 to identify the game titles that are available at the game cloud site for the user account initiating the request. The game titles data 910, in turn, interacts with a games database 912 to obtain the game titles for all the games that are available for the cloud gaming site. As new games are introduced, the games database 912 will be updated with the game code and the game titles data 910 will be provided with game titles information for the newly introduced games. The client device 900 from where the request is initiated may or may not be registered with the cloud gaming site, when the request was initiated. If the user of the client device 900 initiating the request is not a registered user, then the cloud gaming site may identify the user as a new user and select the game titles (for e.g., a default set of game titles) that are appropriate for a new user. The identified game titles are returned to the client device 900 for presenting on a display screen 900-*a*.

User interaction at one of the game titles rendered on the client device is detected and a signal is sent to the cloud gaming site. The signal includes the game title information where the user interaction was detected and the user interaction registered at the game title. In response to the signal received from the client device, the cloud gaming site proactively determines a data center from among a plurality of data centers (914-*a*-914-*d*) where the game is being hosted and sends a signal to the identified data center 914 to load the game associated with the game title for which the user interaction is detected. In some embodiments, more than one data center 914 may be hosting the game. In such embodiments, the cloud gaming site 904 may determine the geo location of the client device initiating the request and identify a data center 914 that is geographically close to the client device 900 and signal the data center 914 to pre-load the game. The geo location of the user may be determined using a Global Position System (GPS) mechanism within the client device, the client's IP address, the client's ping information, to name a few. Of course, the aforementioned ways to detect the geo location of the user may be exemplary and other types of mechanisms or tools may be used to determine the geo location of the user. Identification of a data center that is close to the client device can minimize latency during user interaction with the game. In some embodiments, the identified data center may not have the required bandwidth/capacity/resources to host the game or may be overused. In these embodiments, the cloud gaming site may identify a second data center that is geographically close to the client device. The loading of the game includes loading game code and executing an instance of the game.

In response to receiving the signal from the cloud gaming site, the identified data center may select a server 916 from among a plurality of servers at the data center 914 to instantiate the game on the server. The server is selected based on the hardware/software capabilities available and the game requirements. The server may include a plurality of game consoles 918 and the server may determine which one of the plurality of game consoles to use to load the game. The game console may be similar to an independent game console, or may be a rack-mounted server or a blade server. The blade server, in turn, may include a plurality of server blades with each blade having required circuitry for instantiating a single dedicated interactive application, such as the video game. Of course, the game console described above is exemplary and should not be considered restrictive. Other types of game consoles, including game stations, etc., and other forms of blade server may also be engaged for hosting the identified game.

Once the game console is identified, the generic game-related code for the game is loaded onto the game console and a signal is returned to the client device via the cloud gaming site over the network identifying the game console on which the game is instantiated. The loaded game is thus made available to the user.

It should be understood that the various embodiments defined herein may be combined or assembled into specific implementations using the various features disclosed herein. Thus, the examples provided are just some possible examples, without limitation to the various implementations that are possible by combining the various elements to define many more implementations. In some examples, some implementations may include fewer elements, without departing from the spirit of the disclosed or equivalent implementations.

Embodiments of the present disclosure may be practiced with various computer system configurations including hand-held devices, microprocessor systems, microprocessor-based or programmable consumer electronics, minicomputers, mainframe computers and the like. Embodiments of the present disclosure can also be practiced in distributed computing environments where tasks are performed by remote processing devices that are linked through a wire-based or wireless network.

In some embodiments, communication may be facilitated using wireless technologies. Such technologies may include, for example, 5G wireless communication technologies. 5G is the fifth generation of cellular network technology. 5G networks are digital cellular networks, in which the service area covered by providers is divided into small geographical areas called cells. Analog signals representing sounds and images are digitized in the telephone, converted by an analog to digital converter and transmitted as a stream of bits. All the 5G wireless devices in a cell communicate by radio waves with a local antenna array and low power automated transceiver (transmitter and receiver) in the cell, over frequency channels assigned by the transceiver from a pool of frequencies that are reused in other cells. The local antennas are connected with the telephone network and the Internet by a high bandwidth optical fiber or wireless backhaul connection. As in other cell networks, a mobile device crossing from one cell to another is automatically transferred to the new cell. It should be understood that 5G networks are just an example type of communication network, and embodiments of the disclosure may utilize earlier generation wireless or wired communication, as well as later generation wired or wireless technologies that come after 5G.

With the above embodiments in mind, it should be understood that the disclosure can employ various computer-implemented operations involving data stored in computer systems. These operations are those requiring physical manipulation of physical quantities. Any of the operations described herein that form part of the disclosure are useful machine operations. The disclosure also relates to a device or an apparatus for performing these operations. The apparatus can be specially constructed for the required purpose, or the apparatus can be a general-purpose computer selectively activated or configured by a computer program stored in the computer. In particular, various general-purpose machines can be used with computer programs written in accordance with the teachings herein, or it may be more convenient to construct a more specialized apparatus to perform the required operations.

Although the method operations were described in a specific order, it should be understood that other housekeeping operations may be performed in between operations, or operations may be adjusted so that they occur at slightly different times or may be distributed in a system which allows the occurrence of the processing operations at various intervals associated with the processing, as long as the processing of the telemetry and game state data for generating modified game states are performed in the desired way.

One or more embodiments can also be fabricated as computer readable code on a computer readable medium. The computer readable medium is any data storage device that can store data, which can be thereafter be read by a computer system. Examples of the computer readable medium include hard drives, network attached storage (NAS), read-only memory, random-access memory, CD-ROMs, CD-Rs, CD-RWs, magnetic tapes and other optical and non-optical data storage devices. The computer readable medium can include computer readable tangible medium distributed over a network-coupled computer system so that the computer readable code is stored and executed in a distributed fashion.

Although the foregoing embodiments have been described in some detail for purposes of clarity of understanding, it will be apparent that certain changes and modifications can be practiced within the scope of the appended claims. Accordingly, the present embodiments are to be considered as illustrative and not restrictive, and the embodiments are not to be limited to the details given herein, but may be modified within the scope and equivalents of the appended claims.

It should be understood that the various embodiments defined herein may be combined or assembled into specific implementations using the various features disclosed herein. Thus, the examples provided are just some possible examples, without limitation to the various implementations that are possible by combining the various elements to define many more implementations. In some examples, some implementations may include fewer elements, without departing from the spirit of the disclosed or equivalent implementations.

The invention claimed is:

1. A method, comprising:
    generating a non-fungible token (NFT) for a digital asset used in a video game selected by a player for gameplay;
    monitoring use of the digital asset in the video game during the gameplay to identify a qualifying event occurring in the video game where the digital asset is used; and
    regenerating the NFT for the digital asset using metadata associated with the qualifying event and metadata included in the NFT generated for the digital asset,
    wherein the regenerated NFT provides details of legacy of use of the digital asset and is used to track use of the digital asset within the video game, and
    wherein the NFT is maintained for the digital asset used in the video game and regenerated using the metadata from multiple gameplay sessions of the video game.

2. The method of claim 1, wherein the NFT is regenerated with the metadata of the qualifying event every time the qualifying event occurs in the video game.

3. The method of claim 1, wherein the metadata for the digital asset is identified using time and space attributes associated with game space of the video game where the digital asset is used by the player.

4. The method of claim 1, wherein the NFT of the digital asset is associated with the player using the digital asset during occurrence of the qualifying event.

5. The method of claim 4, wherein the digital asset associated with the player and the NFT associated with the digital asset are portable to other video games by the player, the porting of the NFT and the digital asset enabled using an application programming interface.

6. The method of claim 5, wherein regenerating the NFT of the digital asset further includes synchronizing the metadata of the regenerated NFT of the digital asset in the video game with other video games in which the digital asset is used.

7. The method of claim 1, wherein the metadata includes information related to at least a timeline in the video game that corresponds to a specific portion of a game space associated with the qualifying event where the digital asset is used, a player identity of the player using the digital asset, participant identities of participants in the qualifying event, a game identity of the video game, a level identity of game level associated with the specific portion, and an event identity and details of the qualifying event of the video game,
wherein the specific portion of the game space is identified using time and space attributes associated with the game space of the video game, and
wherein the participants include other players or virtual characters of the video game.

8. The method of claim 1, wherein the qualifying event is an event that meets a predefined threshold defined based on statistics collected during the gameplay of the video game.

9. The method of claim 8, wherein the predefined threshold is throttled up or down to match a legacy goal defined for the digital asset used in the video game.

10. The method of claim 8, wherein the predefined threshold for the event is defined by a game developer or a player or a game host or a game content sponsor of the video game.

11. The method of claim 1, wherein monitoring the use includes providing a first option to the player to generate the NFT for the digital asset used by the player during the qualifying event when no NFT is available for the digital asset, the first option provided in response to an event within the video game meeting a predefined threshold to become the qualifying event.

12. The method of claim 1, wherein regenerating the NFT includes providing a second option to port the NFT for the digital asset from a second video game, selection of the second option causes retrieval of the metadata included in the NFT of the digital asset from the second video game in which the digital asset was previously used, the metadata of the digital asset retrieved from the second video game and the metadata of the qualifying event in the video game used to regenerate the NFT for the digital asset.

13. The method of claim 1, further includes providing a timeline of the gameplay identifying a plurality of qualifying events that have occurred during the gameplay of the video game in which the digital asset was used, the plurality of the qualifying events includes the identified qualifying event, each of the plurality of qualifying events is provided as a thumbnail on the timeline, the timeline providing a visual indication of the legacy of use of the digital asset identified from the metadata included in the NFT, the thumbnail providing access to a video recording of a portion of the gameplay of the video game for the qualifying event in which the digital asset was used.

14. The method of claim 1, further includes providing a timeline of the gameplay identifying a plurality of qualifying events including the identified qualifying event that occurred during the gameplay in which a plurality of digital assets including the digital asset were used, each qualifying event represented as a thumbnail on the timeline, the thumbnail providing access to a video recording of a portion of the gameplay of the video game where at least one of the plurality of digital assets was used.

15. A method, comprising:
receiving inputs from a player for a video game selected for gameplay, the inputs used to update game state of the video game and provide gameplay data for rendering at a client device of the player, the gameplay data identifying a game space where the player is currently located in the video game;
identifying one or more digital assets available within the game space where the player is located, each digital asset of the one or more digital assets associated with a corresponding non-fungible token (NFT) and is identified from metadata included in the corresponding NFT; and
presenting details related to the one or more digital assets available in the game space of the player to assist the player in making strategic decisions on the gameplay of the video game,
wherein the details are provided using metadata included in the corresponding NFT of the one or more digital assets.

16. The method of claim 15, wherein the one or more digital assets are presented on a map representing the game space where the player is located in the video game, the one or more digital assets are presented using visible indicators to allow the player to track the one or more digital assets.

17. The method of claim 16, wherein the one or more digital assets are associated with one or more other players, the visible indicators are provided to one or more virtual characters representing the one or more other players to allow tracking of the one or more digital assets of the one or more other players in the game space of the video game.

18. The method of claim 16, wherein the visible indicators include any one of pins, balloons, arrows, or markers provided at locations in the game space where each one of the digital assets is located, wherein the visible indicators are color coded in accordance to a type associated with each digital asset.

19. The method of claim 15, wherein the video game is a multiplayer game played between the player and other players,
wherein when the player obtains a digital asset owned by a second player, the NFT associated with the second player is automatically transferred from the second player to the player, the automatic transferring includes regenerating the NFT of the digital asset with information related to the player and information related to obtainment of the digital asset from the second player, and
wherein the digital asset is obtained by any one of defeating a virtual character representing the second player, or killing the virtual character representing the second player, or buying from the second player or trading.

* * * * *